United States Patent [19]

Fischer et al.

[11] Patent Number: 4,667,709
[45] Date of Patent: May 26, 1987

[54] ARRANGEMENT FOR DOSINGLY FILLING OF FLUENT FILLING MATERIAL INTO CONTAINERS

[75] Inventors: Georg Fischer, Verbert; Herbert Augst; Lutz Langenhahn, both of Duesseldorf, all of Fed. Rep. of Germany

[73] Assignee: Benz & Hilgers GmbH, Duesseldorf, Fed. Rep. of Germany

[21] Appl. No.: 719,700

[22] Filed: Apr. 4, 1985

[30] Foreign Application Priority Data

Apr. 4, 1984 [DE] Fed. Rep. of Germany ....... 3412628

[51] Int. Cl.⁴ .............................................. B65B 3/04
[52] U.S. Cl. ...................................... 141/91; 141/90; 141/85; 141/146; 141/249; 141/258; 137/246; 137/625.21
[58] Field of Search .................. 141/85, 116, 89–92, 141/129, 98, 146, 147, 249, 258, 242; 222/148, 149, 309; 137/246, 246.11, 237, 625.21, 625.23, 625.46; 251/208

[56] References Cited

U.S. PATENT DOCUMENTS

| 2,107,987 | 2/1938 | Johnson | 141/116 |
| 2,321,994 | 6/1943 | Chapman | 141/146 X |
| 2,666,564 | 1/1954 | Minard | 141/142 |
| 3,991,797 | 11/1976 | Uth et al. | 141/91 |
| 4,234,107 | 11/1980 | Gernlein | 222/309 |
| 4,254,806 | 3/1981 | Elsworth | 141/116 |
| 4,273,263 | 6/1981 | Voegele et al. | 141/91 X |
| 4,318,431 | 3/1982 | Evans | 141/90 |
| 4,373,560 | 2/1983 | Elsworth | 141/129 |

FOREIGN PATENT DOCUMENTS 669204 8/1963 Canada ................ 141/129
1140121 11/1962 Fed. Rep. of Germany ...... 141/116

Primary Examiner—Stephen Marcus
Assistant Examiner—Ernest G. Cusick

[57] ABSTRACT

The invention relates to an arrangement for dosingly filling of fluent or pasty filling material into a container. The arrangement has a housing in which a control element is rotatably mounted. A feed and outlet passage for the filling material is alternately unblocked and a reciprocating dosing piston is provided in the housing. For purposes of achieving a compact and simple construction and a simple assembly, as well as for achieving a good cleaning, the housing is hermetically sealed on all of its sides and the control element is in the form of a rotational cylinder operatively mounted in the region of the feed and outlet passages for the filling material. The dosing cylinder is coaxially mounted with respect to the rotational cylinder and is provided with a piston rod so that the dosing piston is slidably movable within the housing.

11 Claims, 11 Drawing Figures

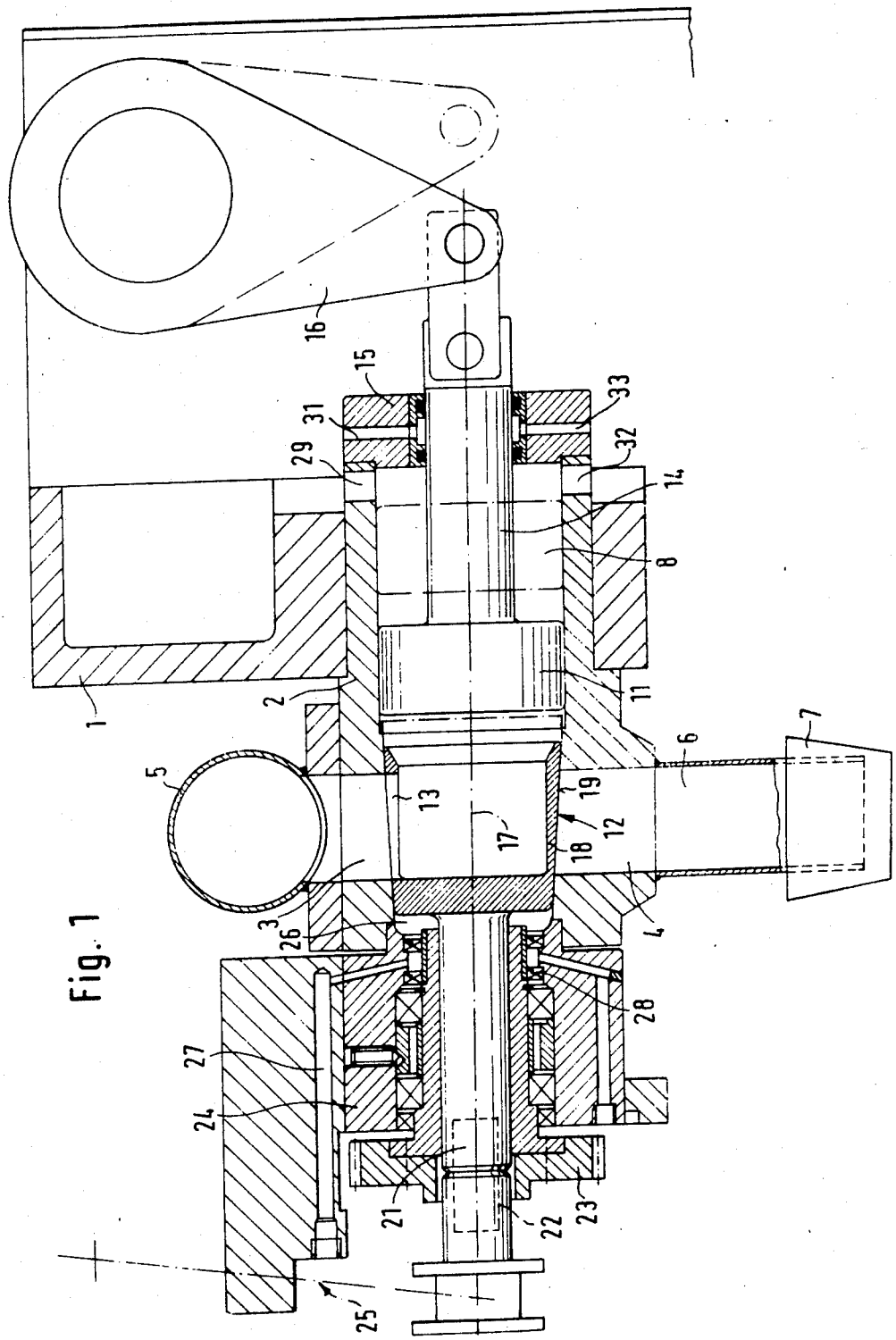

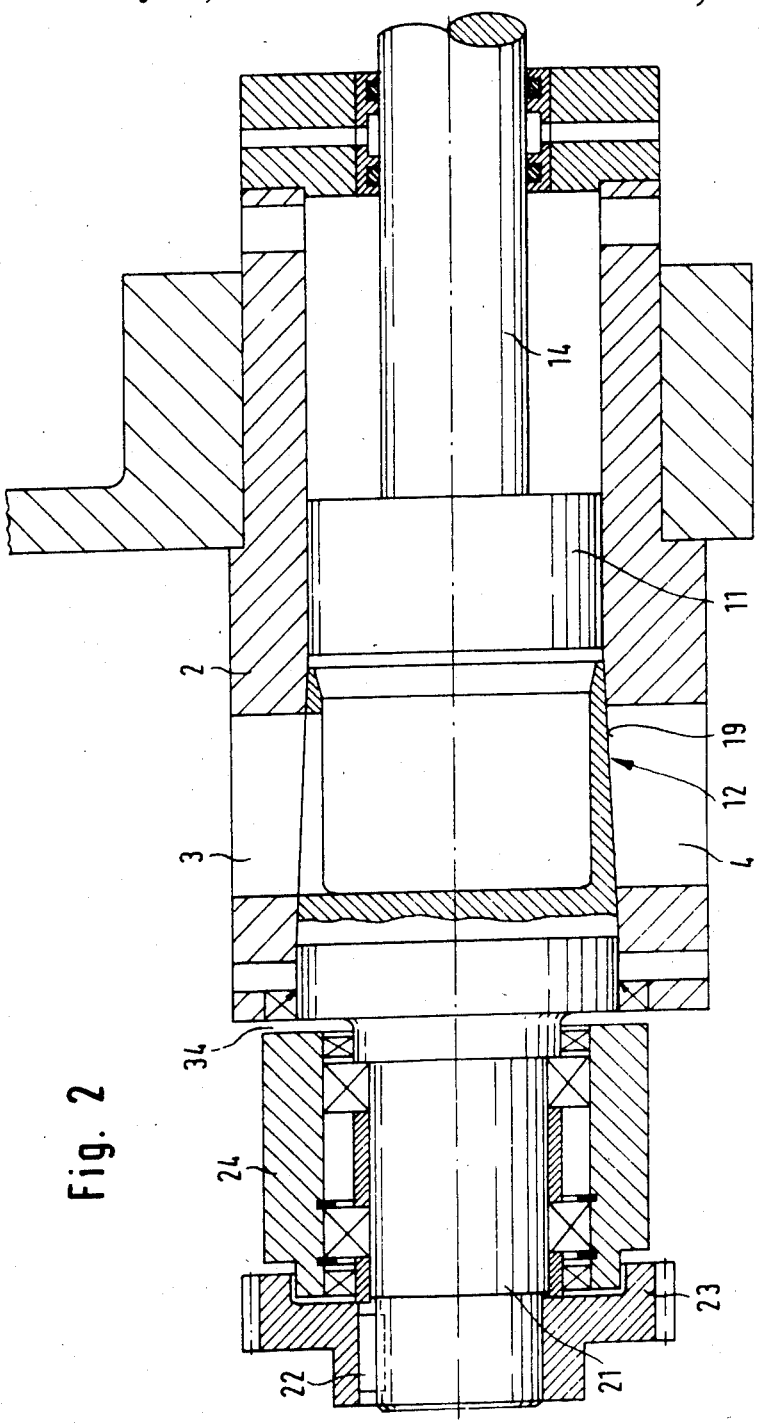

ARRANGEMENT FOR DOSINGLY FILLING OF FLUENT FILLING MATERIAL INTO CONTAINERS

BACKGROUND OF THE INVENTION

The invention relates to the dosingly filling of fluent or pasty filling material into containers. The invention provides a suitable arrangement for carrying out this method. This arrangement includes an inlet conduit and outlet conduit for the filling material and a cleaning fluid. The arrangement includes a housing in which a control element is rotatably mounted which element is adapted to alternatively release and seal the inlet (feed) and outlet (dispense) conduits for the filling material and further include a reciprocating piston rod for a dosing piston which is coaxially arranged with respect to the rotational axis of the control element.

There has become known in practice an arrangement for dosingly filling fluent filling material. Such arrangement includes a dosing piston movably mounted in a cylinder forming the control element. By virtue of the guiding of the dosing piston in such cylinder, the latter may be relatively long and must have a large diameter, in order to accommodate the piston stroke of the dosing piston. Such known arrangement is not only quite complex and expensive to manufacture, but also presents operational difficulties such as adapting the cylinder into the housing and the necessary peripheral sealing of such cylinder. Since the rotational cylinder is preferably arranged in a prone position, such configuration presents a further considerable operational problem as it makes the cleaning of the arrangement more difficult. Heretofore this operational problem was overcome in that the movable mounted piston rod was disconnected from its drive and thereafter the dosing piston was fully retracted from the rotational cylinder. Disregarding for the moment that frequently the rotational cylinder cannot be manually moved but requires a special auxiliary tool for effecting such movement, it is furthermore necessary that the free end face of the rotational cylinder must be sealed by means of a flap which is pivotally mounted on the housing. Thereafter there is eventually introduced a cleaning fluid via the inlet and outlet conduits by way of axially adjusting the entire rotational cylinder. The afore-described cleaning process has been found inadequate because a good rinsing of all parts is not possible. This is so because, first of all, a so-called "CIP-cleaning" (cleaning in place), which means a circular peripheral rinsing is not possible due to the convoluted configuration of some of the parts forming the arrangement. Therefore, the cleaning operation is not only quite complex and burdensome, but can lead, under certain circumstances, to damage of the built-in and dismountable parts, in particular the seals of the arrangement. Finally, it is necessary for changing the format of the arrangement to exchange not only the dosing piston but also the rotational cylinder.

SUMMARY OF THE INVENTION

It is an object of this invention to provide an improved arrangement for dosingly filling fluent filling material into containers. Such improved arrangement is of substantially simpler construction and can be more easily assembled than the arrangements of the state of the art. Simultaneously it is possible by means of simple mechanical operational steps to achieve an excellent rinsing of the arrangement.

The arrangement of the invention includes a housing defining a completely hermetically sealed inner chamber (with the exception of the inlet and outlet conduits) for directly receiving a control element which extends over the region of the feed and dispensing conduits for the filling material and which has a coaxially arranged dosing piston. The piston rod of the dosing piston is slidably movably mounted at one of the end faces of the housing. By means of the arrangement of the invention it is possible to first of all achieve a substantially simpler overall construction, since the control element extends only over the region of the feed and dispensing conduits. The dosing piston is directly guided within the housing and thereby expensive bearing supports and seals which are difficult to be maintained are dispensed with. By rigidly guiding the piston rod the guiding for the dosing piston is made simpler, whereby simultaneously the following advantages are achieved: (a) a cleaning is possible without dismounting one of the main constructional elements; (b) a further advantage is achieved by making it possible to change the format of the arrangement, whereby in the rigidly mounted housing corresponding sleeves may be inserted, so that only the dosing piston needs to be exchanged.

In an advantageous embodiment of the invention the end face which serves for guiding the piston rod can be formed by means of a cover mounted on the housing and furthermore the other confronting end face of the housing is sealable by means of the control element proper.

Of particular significance for housing is the fact that the control element can be constructed as a flyingly mounted (freely movable) roational cylinder. Thereby there is assured that the control portion of the rotational cylinder is disposed within the housing and that the support part of the rotational cylinder is mounted outside of the housing.

The rotational cylinder can be constructed in different ways. For example at least the outer wall surface of the wall of the rotational cylinder can be conically shaped. In such case, the wall surface for the longitudinal surface of the dosing cylinder can be divergent or also convergent.

On the other hand, it is also possible that the outer and under certain circumstances also the inner wall surface of the rotational cylinder wall are cylindrically shaped and it is even conceivable that the wall of the rotational cylinder extends only over a portion of the overall periphery. Such part can, for example, be formed by means of a segment having an arc of less the 180 degrees (preferably 165 to 180 degrees). By means of corresponding rotation, respectively switching of these segments, it is possible in a desirable manner to dose the filling material and eventually also achieve a cleaning thereof. For this purpose it is advantageous to make the rotational cylinder axially adjustable in the direction of the rotational axis.

The rotational cylinder and the dosing piston may be constructed so as to have equal diameters and may be arranged, for purposes of facilitating the cleaning process, in an enlarged rinsing chamber of the housing between the rotational cylinder and the dosing piston.

It is also furthermore possible to construct the dosing cylinder with an exterior diameter that is smaller than the interior diameter of the rotational cylinder and thereby be capable of moving the rotational cylinder and dosing piston simultaneously between two enlarged rinsing chambers arranged in the housing. In this manner the dosing piston as well as the rotational cylinder can be effectively rinsed by a cleaning fluid over all their surfaces.

It is even more advantageous to arrange the inlet and outlet conduits for the filling material in the region of the rinsing chamber. In this case, the dosing piston moves into the region of the rotational cylinder, so that the otherwise necessary dead space is completely dispensed with. In this way an even more reduced constructional length of the arrangement is possible. By means of a suitable construction it is even possible that the rotational cylinder itself does not carry out an axial movement, respectively a very reduced axial sliding is only necessary.

By suitably arranging auxiliary feed and outlet conduits for the cleaning fluid it is possible to arrange them in such a way that the cleaning is effected in a closed fluid circuit.

BRIEF DESCRIPTION OF THE DRAWINGS

With these and other objects in view, which will become apparent in the following detailed description, the present invention, which is shown by example only, will be clearly understood in connection with the accompanying drawing, in which:

FIG. 1 is a side-elevational view, partially in cross-section of a first embodiment of an arrangement in accordance with this invention for dosing which arrangement has a conically-shaped rotational cylinder;

FIG. 2 is side-elevational view, partially in cross-section, of a modified construction of the conically shaped rotational cylinder;

DETAILED DESCRIPTION

Figure 2A:
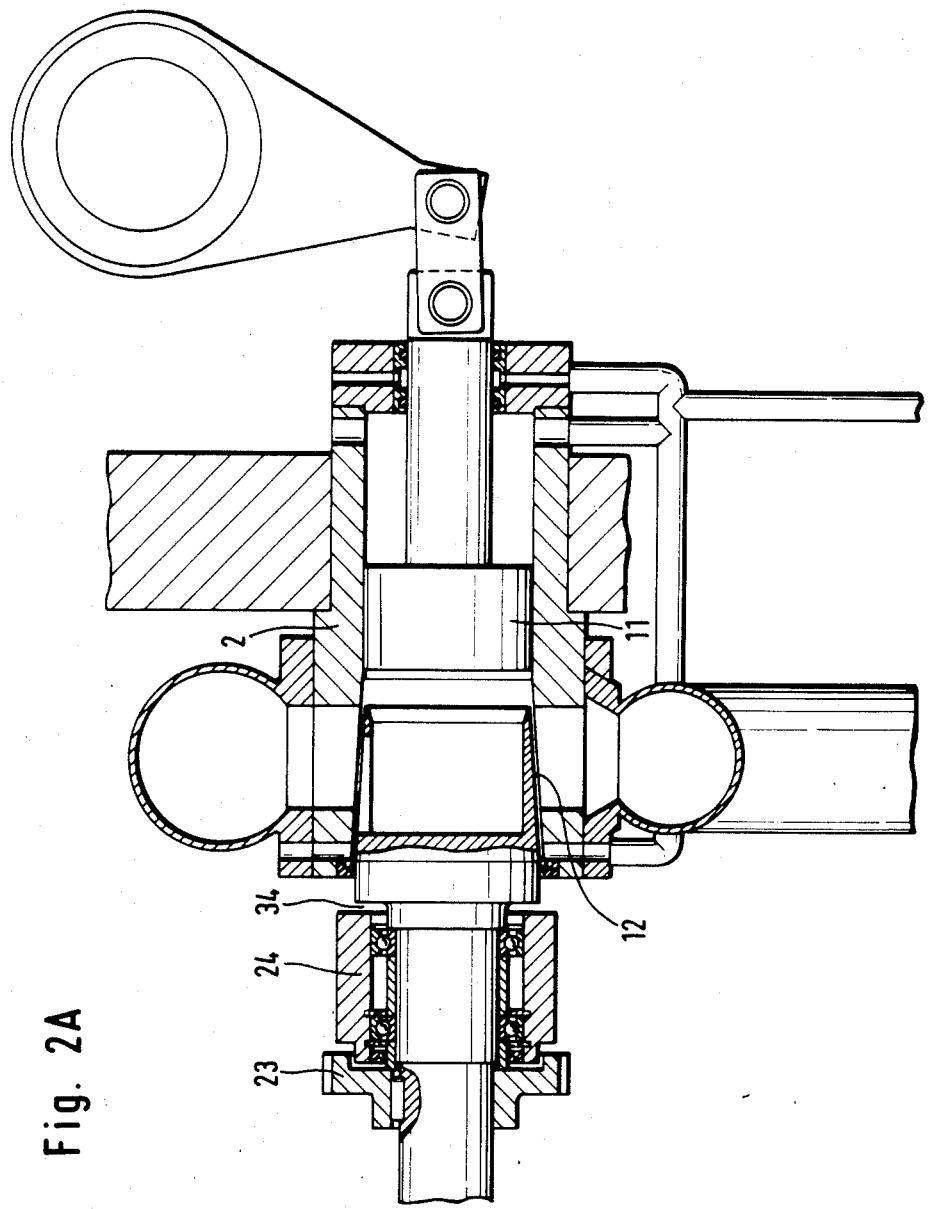
FIG. 2A is a side-elevational view, partially in cross-section, of the modified construction of FIG. 2 illustrating the arrangement in the cleaning phase.

Referring now to the embodiment illustrated in FIG. 1, there is shown a suitable arrangement for dosingly filling fluent, respectively pasty, filling material, such as, for example, margarine or similar filling material. The arrangement consists essentially of a machine base 1, which supports a housing 2 therein, having an inlet passage 3 as well as an outlet passage 4 for the filling material. The inlet passage 3 is in fluent communication with a feed pipe 5, whereas there is provided at the outlet passage 4 a dispensing mouth piece 6 for filling suitable containers 7.

The housing 2 has an inner chamber 8 in which a control element, in the form of a rotational cylinder 12, and a dosing piston 11 are operatively mounted. The rotational cylinder 12 extends essentially over the region of the feed and outlet passages 3, 4 and has a window 13 in its peripheral wall.

The dosing piston 11 includes a piston rod 14 which is axially guided in a cover 15, which cover seals one end of the inner chamber 8 and forms a bearing support for the piston rod 14. The piston rod 14 is pivotally connected to an actuating arm 16, which actuating arm is drivingly connected to a non-illustrated drive. The dosing piston 11 can therefore carry out a reciprocal movement, substantially coaxial with respect to the rotational axis 17 of the rotational cylinder 12.

The rotational cylinder 12 has a wall 18 having a frustoconical exterior surface 19. The cone is configured in such a way that the outer wall surface 19 diverges towards the dosing cylinder 11. The rotational cylinder 12 is drivingly coupled with a coupling 22 (not illustrated in detail) on which a driving gear wheel 23 is coaxially mounted. The rotational drive for the rotational cylinder 12 is introduced via this gear wheel 23. The rotational cylinder 12 is flyingly mounted via the pin 21 in a bearing support block 24, which in the illustrated embodiment, abuts directly against the housing 2. The rotational cylinder 12 can also be axially moved in addition to its rotational movement in a manner similar to the dosing piston 11. For this purpose a conventional linkage 25 is provided (only illustrated schematically by dot-dash lines in FIG. 1), which can be positionally adjusted by means of a non-illustrated drive. With the aid of this linkage 25 the rotational cylinder 12 can be slidably shifted from an operative position shown in full lines to a position shown in dot-dashed lines, which latter position constitutes the cleaning position. A rinsing chamber 26 is disposed between the rotational cylinder 12 and the bearing support block 24 and housing 2, into which cleaning fluid may be introduced by the feed passage 3 when the rotational cylinder 12 is in the cleaning position. Furthermore, it is also possible to introduce cleaning fluid via a conduit 27 into the region of the sealing rings 28 into the region of the bearing support block 24. Further feed conduits 29, 31 and outlet conduits 32, 33 for the cleaning fluid are arranged in the region of the opposite end of the housing 2, respectively the cover 15.

While FIG. 2 illustrates the production position of the arrangement, FIG. 2A illustrates the cleaning position of the arrangement. A non-illustrated mouthpiece is removed from the outlet passage 4 and replaced by an outlet pipe I. For purposes of cleaning the dosing piston 11 by way of circulatory rinsing there is carried out in practice a movement of the bearing support 24 together with the rotational conically-shaped cylinder 12 towards the left a distance of about 15 mm as illustrated in FIG. 2A. The dosing is then actuated. If the rotational cylinder 12 and the dosing piston 11 now reciprocate, then the cleaning fluid is fed via the feed pipe O and the couplings E, F and G. The machine operates in this cleaning position until only cleaning fluid exits from the outlet pipe I and the outlets K, L and M. In this fashion a good CIP cleaning is achieved.

Since the arrangement, as described hereinabove, remains unchanged during the production phase and the cleaning phase with the exception of the afore-described differences, there is assured, that during the production phase no filling material or dosing material remains in the support block or housing as a result of a leak along the rotational cylinder. On the other hand, there is also prevented that grease or other lubrication enters from the bearing support into the rotational cylinder. In order to assure that this sealing remains intact, there is provided between the housing 2 and the bearing support 24 a gap 34.

MANNER OF OPERATION

The afore-described arrangement of the invention operates as follows:

The dosing according to the arrangement is based on the principle of volume displacement. With the exiting dosing piston 11 the filling material is sucked via the inlet passage 3 into the continuously rotating rotational cylinder 12. As soon as the window 13 reaches the region of the outlet passage 4, the filling material is expelled via the action of the inwardly traveling dosing piston 11. For purposes of cleaning the arangment it is switched into the cleaning mode. For this purpose the rotating rotational cylinder 12 and dosing piston 11 are moved into the cleaning position, indicated in dash-dotted lines in FIG. 1, and simultaneously cleaning fluid is fed via the feed conduit 3, 29, 31 and a feed conduit 27. By means of the reciprocating dosing piston 11 the latter self-cleans itself whereby simultaneously the piston rod 14 is cleaned. The rotational cylinder 12 is, as a result of its fructo-conical configuration, cleaned on all of its sides and above all in the region of the rinsing chamber 26 by being rinsed by the cleaning fluid. Thereby a good cleaning action is received without special additional constructional members for the assembly.

ADDITIONAL EMBODIMENTS

The alternate embodiment of FIG. 2 differentiates itself from the embodiment of FIG. 1 primarily in the construction of the rotational cylinder 12 and the manner in which it is mounted in the bearing support 24. While in the rotational cylinder 12 in FIG. 1 the outer surface 19 of the rotational cylinder 12 diverges in the direction of the dosing piston 11, in the embodiment of FIG. 2, this outer surface 19 converges in the direction of the dosing cylinder 11, which means that at the end face of the dosing piston 11 the diameter of the rotational cylinder 12 is smaller than at the opposite side thereof. Moreover, the bearing support of the rotational cylinder via the pin 21 is of simpler construction since the pin 21 is directly rotatably mounted in the bearing support 24 and is operatively connected by means of a suitable coupling 22 with the gear drive wheel 23. There remains a gap 34 at all times between the bearing support 24 and the housing 2 which prevents that filling material penetrates into the bearing support of the rotational cylinder 12. FIG. 2 illustrates the production position of the arrangement. Insofar as a cleaning prior to operation (CIP-cleaning) is to be carried out, the bearing support 24 together with the frusto-conically shaped rotational cylinder 12 can be pulled towards the left (as seen in FIG. 2) into a cleaning position, so that also here the rotational cylinder can be well-rinsed on all sides by the cleaning fluid, which has been introduced by way of the inlet passage 3.

The embodiment of FIG. 2, when in operation, has an advantage over the embodiment of FIG. 1 in that the dosing piston 11 can be built into the housing 2 from one side and the rotational cylinder 12 from the other side, so that a mounting and disassembling requires a relatively small space.

It is, of course, understood that in the housing of FIGS. 1 and 2 it is also possible to mount a plurality of dosing pistons 11 and rotational cylinders 12 one next to the other.

Figure 3:
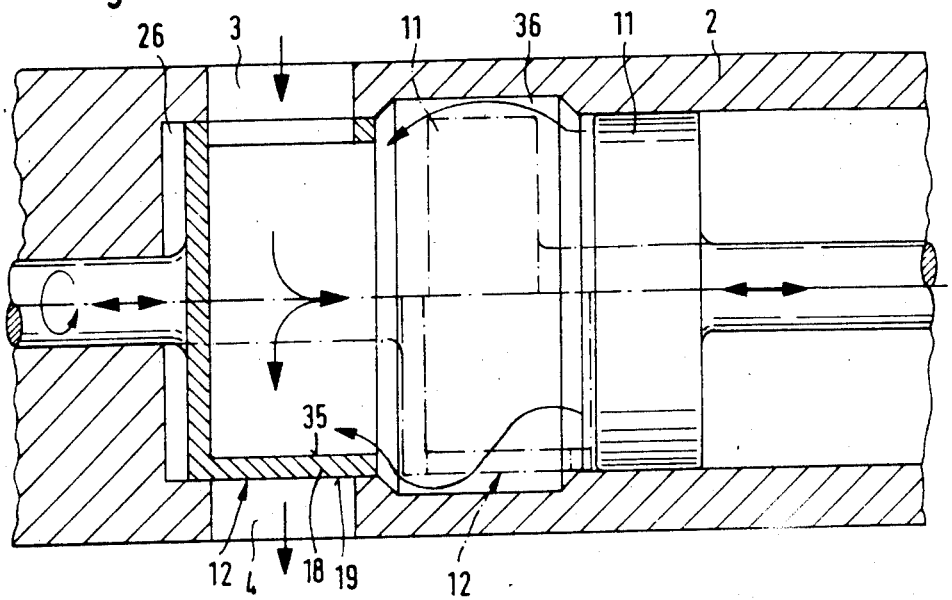
FIG. 3 is a side-elevational view, partially in cross-section, of a cylindrical rotational cylinder having a rinsing chamber which is arranged between the rotational cylinder and a dosing piston.

In the embodiment of FIG. 3 the wall construction 18 of the rotational cylinder 12 has an inner surface 35 and an outer surface 19, both of which are cylindrically shaped. The diameter of the outer wall surface 19 substantially corresponds to the diameter of the dosing piston 11, so that the housing 2 is relatively simple to manufacture.

A further rinsing chamber 36 is arranged in the housing 2 between the rotational cylinder 12 and the dosing piston 11. Rinsing can be successively introduced into the arrangement. The rinsing action occurs as is illustrated in the lower portion of FIG. 3, the rotational cylinder 12 and the dosing piston 11, as is illustrated in the upper portion of FIG. 3. By the successive introduction of the rotational cylinder 12 and the dosing piston 11 both of them can be effectively cleaned with the rinsing fluid.

The rotational cylinder 12 and dosing piston 11 coact with the expanded rinsing chamber 36 as follows: As is illustrated in FIG. 3 the cleaning of the arrangement includes moving the rotational cylinder first in the position illustrated in dot-dashed lines, which means towards the right in FIG. 3 until it is disposed in the region of the rinsing chamber 36. In this position there then occurs a thorough circulatory rinsing which will be explained hereinafter. As soon as a complete rinsing has been achieved, the rotational cylinder 12 is again moved into the starting position towards the left. As a result of the dosing piston 11 now moves into the region of the rinsing chamber 36, that is in a position which is indicated by dot-dashed lines in the upper part of FIG. 3. The dosing piston 11 is then also rinsed with cleaning fluid, as is indicated by the arrows in FIG. 3.

Figure 4:
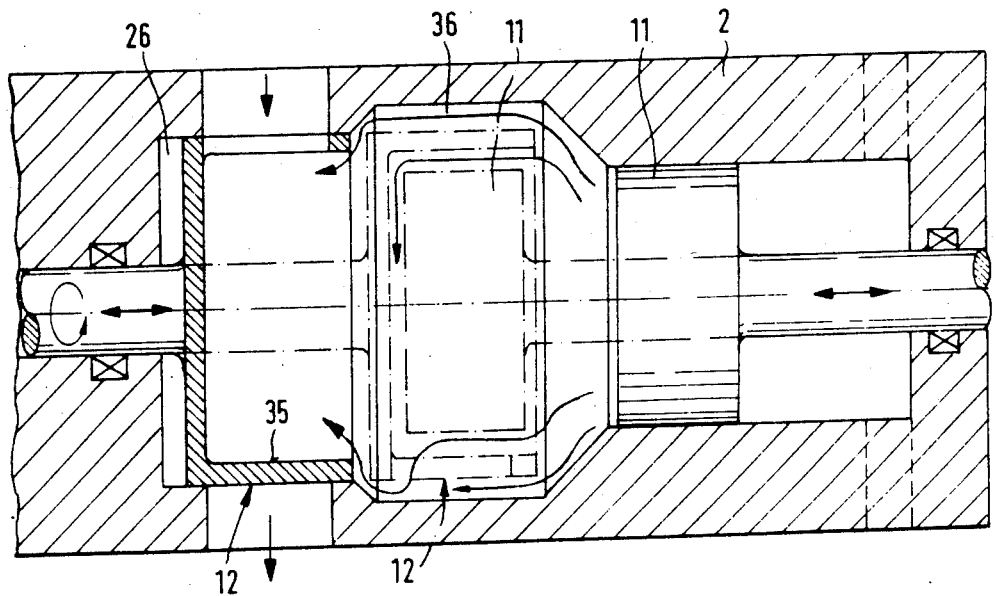
FIG. 4 is modified embodiment of the embodiment of FIG. 3, shown similarly in side-elevation, partially in cross-section.

In the embodiment of FIG. 4 the dosing piston 11, which has a diameter that is smaller than the interior diameter of the interior cylindrical surface 35 of the rotational cylinder 12, so that the dosing piston 11 and rotational cylinder 12 can be simultaneously introduced into the rinsing chamber 36 and nevertheless both of them can be well-cleaned by the streaming rinsing fluid streaming therepast.

The difference between the embodiment of FIG. 4 and the embodiment of FIG. 3 resides in that the rotational cylinder 12 and the dosing piston 11 are simultaneously moved into the region of the expanded rinsing chamber 36 and therefore the cleaning (rinsing) occurs simultaneously.

Figure 5:
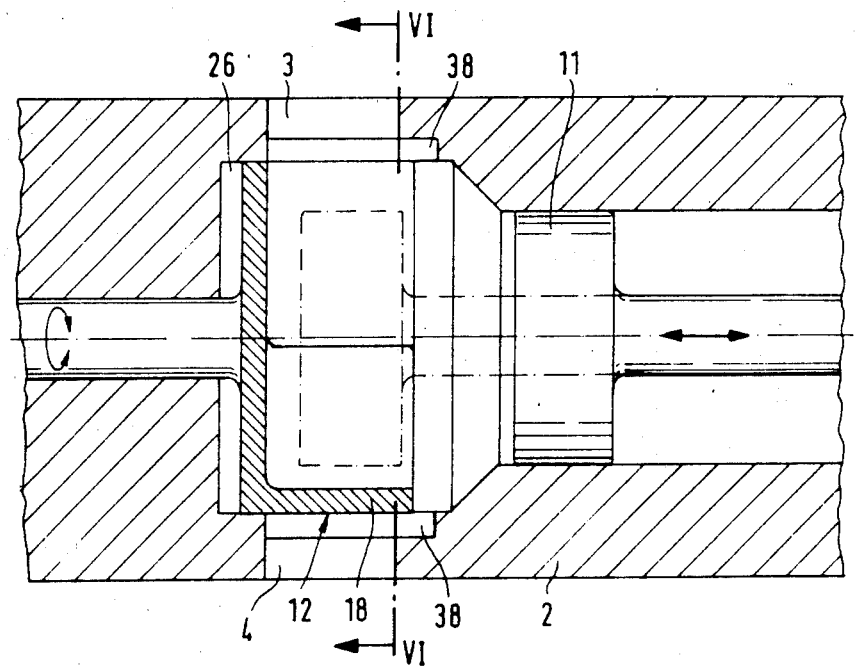
FIG. 5 is a side-elevational view, partially in cross-section, of modified embodiment of a rotational cylinder, having a segment-like wall section.

In FIG. 5 there is illustrated how the rinsing position for the dosing piston 11 can be disposed in the region of the rotational cylinder 12, respectively inlet passage 3 and the outlet passage 4 of the housing 1. In this manner the otherwise necessary dead space for the auxiliary rinsing chamber 36 can be dispensed with.

Figure 6:
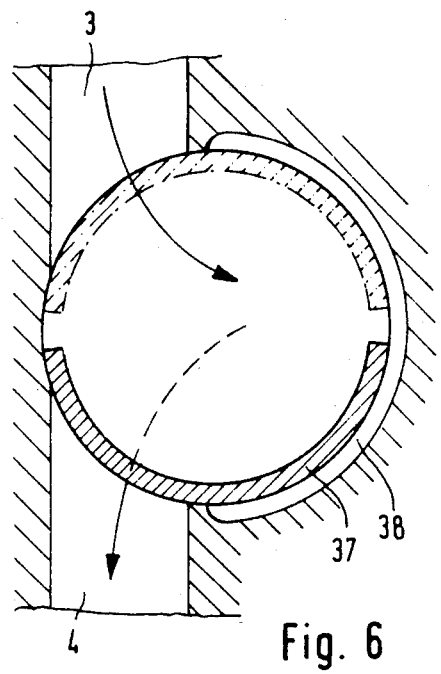
FIG. 6 is a cross-sectional view along line IV—VI in FIG. 5, showing the rotational cylinder in a first operative position.

In a further variation of the invention the rotational cylinder 12 of FIG. 5 is constructed in a very particular manner, that is the configuration is such that its wall 18 extends only over a portion of the external circumference. In this manner, as can be noted from FIGS. 6 and 7, a segment-section (circular arcuate) of less than 180 degrees is formed. As is particularly illustrated in FIGS. 6 and 7, the inlet and outlet passages 3, 4 extend tangentially, respectively secant-like with respect to the rotational cylinder 12, whereby at the side that faces away from the inlet passage and outlet passages 3, 4 a ring channel 38, extending over 180 degrees, is presented. This ring channel 38 is also illustrated in FIG. 5. Starting from the position illustrated in full lines in FIG. 7 of the segment-section 37, the production position can at all times be achieved by rotation of 90 degrees or less in one or the other direction. One position is illustrated in FIG. 6 with phantom-lines, in which also the inlet passage 3 is open, whereas the outlet passage 4 is closed by means of the segment-section 37. By the outwardly moving dosing piston 11 the filling material is sucked in to the dosing chamber via the inlet passage 3 and the rotational cylinder 12 is thereafter moved into the position illustrated in FIG. 6 with dot-dashed lines, in which also the inlet passage 3 is closed by the segment-section 37, whereas the outlet conduit 4 remains open, so that the filling material is expelled by the dosing piston 11 when the latter is moved inwardly.

Figure 7:
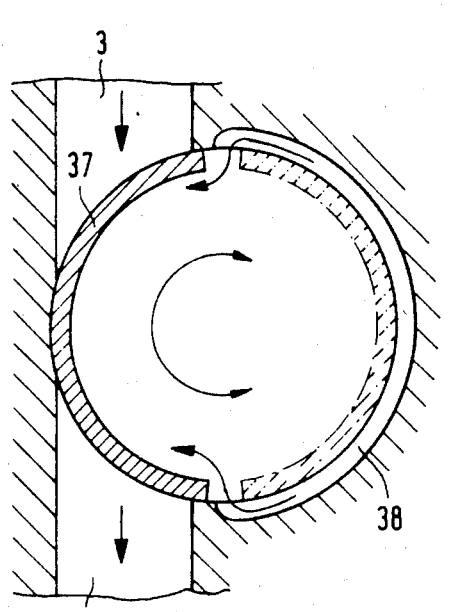
FIG. 7 is a cross-sectional view corresponding to the cross-sectional view of FIG. 6, showing the rotational cylinder in a second operative position.

For purposes of cleaning the arrangement, the rotational cylinder is moved from the position illustrated in FIG. 7 with phantom-lines about an angle of 180 degrees into the position in FIG. 7 illustrated with dot-dashed lines in which with a minor axially adjusted rotational cylinder 12 in the direction of the dosing piston 11. Rinsing fluid can be introduced via the rinsing chamber 26, so that by coaction with the ring channel 38 and the feeding of the rinsing fluid via the inlet passage 3 the dosing piston is well stream-rinsed on all of its sides by the rinsing fluid.

Figure 8:
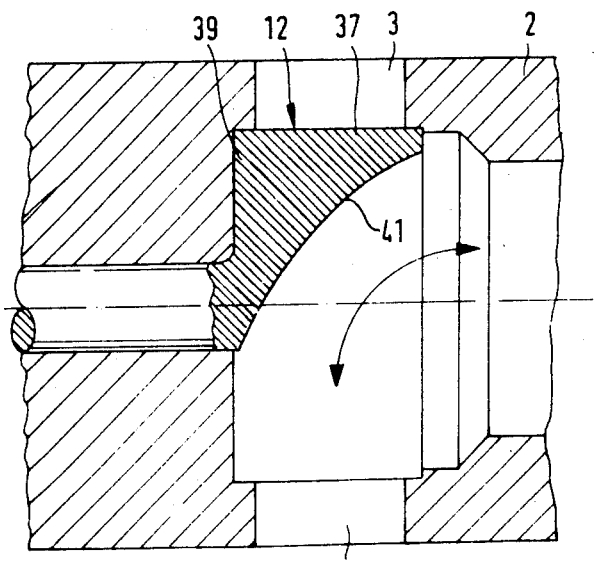
FIG. 8 is a modified embodiment of the segment-like rotational slider, shown in cross-section.

FIG. 8 illustrates a further embodiment of the rotational cylinder. In this embodiment a bottom wall 39 of the rotational cylinder 12 extends over the portion of the rotational cylinder 12 merges with the wall 18. Moreover, the inwardly facing sides of the segment-section 37 merge into a single curve, as indicated by the reference number 41. Thereby a favorably expulsion of the filling material via the outlet passage 4 is achieved.

It is understood that the invention is not only limited to those embodiments hereinabove described and illustrated, but all those also within the scope and spirit of the claims which show how to assemble the various members to form the various embodiments. For example, with a suitable construction of the seal of the rotational cylinder 12 relative to the housing in the embodiment of FIG. 5 an axial sliding adjustment of the rotational cylinder 12 at the cleaning position can, under certain circumstances, be dispensed with.

In order to adjust the format of the arrangement it is possible, furthermore, to introduce bushings into the housing 2, so that by exchanging dosing pistons 11 other expulsion masses can be removed.

Figure 9:
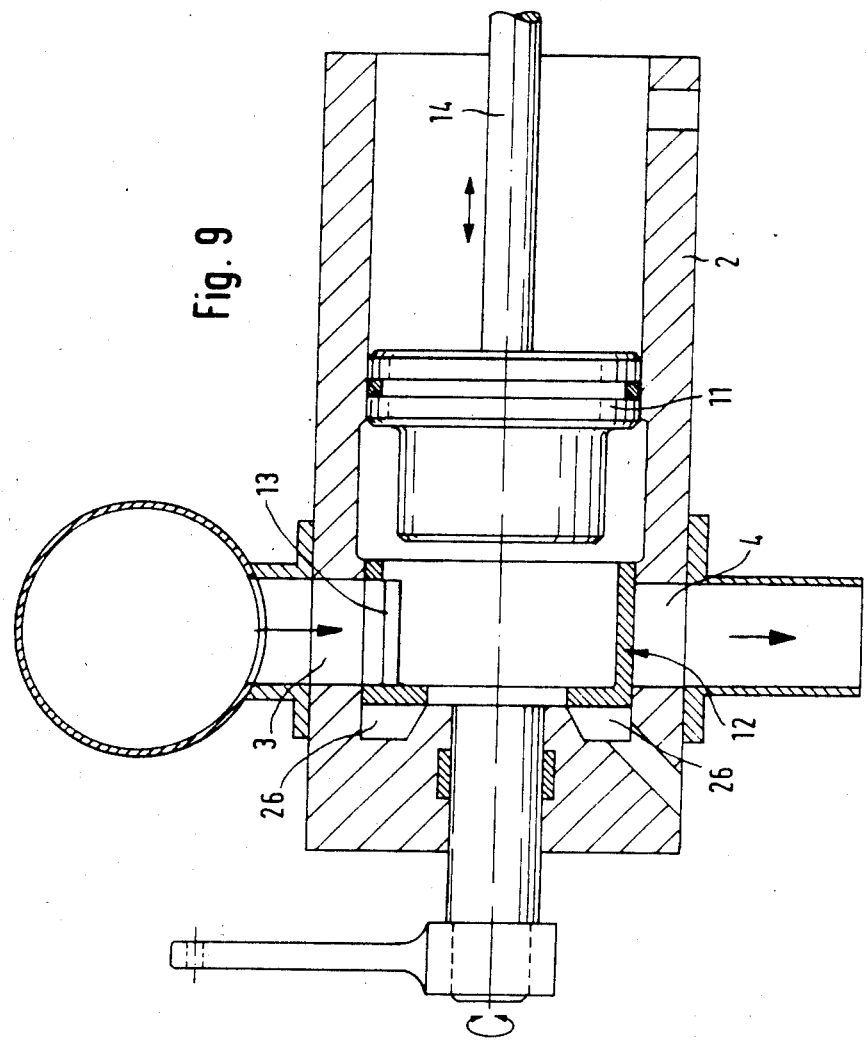
FIG. 9 is a side-elevational view, partially in cross-section, of a further embodiment of the dosing arrangement of the invention.

FIG. 9 illustrates a dosing arrangement, at which the dosing piston 11 is of stepped construction and the rotational cylinder 12 is of pot-like shape. The rinsing chamber 26 is formed as a ring channel. The rotational cylinder 12 can be rotated about an angle of 120 degrees and can, for purposes of cleaning, be shifted in a horizontal direction.

Figure 10:
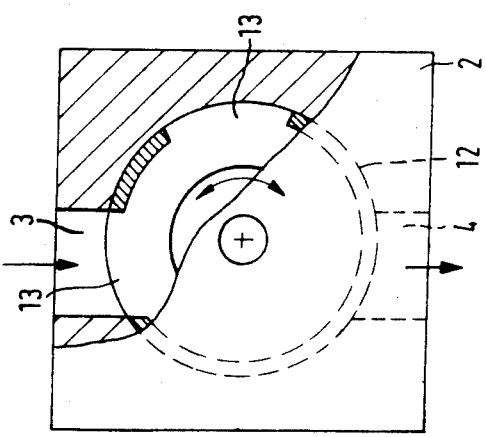
FIG. 10 is a schematic end-elevational view, partially in cross-section, of the dosing arrangement of FIG. 9.

FIG. 10 illustrates the gaps in the peripheral wall surface of the rotational cylinder of FIG. 9.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

We claim:

1. An improved arrangement for dosingly filling of fluent or pasty filling material into containers, which arrangement includes
   a housing having
   an inlet and
   an outlet passage for the filling material and cleaning fluid,
   a control element rotatably mounted in said housing which is adapted to alternately block and unblock said inlet and outlet passages, and
   a dosing piston which is reciprocally mounted in said housing by means of
   a piston rod affixed thereto and is coaxial relative to the rotational axis of said control element, the improvement comprising,
   wherein said housing defines
   an inner chamber for directly receiving said control element, said inner chamber being accessible via said inlet and outlet passages but being otherwise hermetically sealed; said dosing piston sealing one end of said inner chamber;
   a first bearing support mounted at one end of said housing;
   a reciprocally movable piston rod mounted in said bearing support and being rigidly axially connected to said dosing piston, wherein said first bearing support forms
   a cover for said housing at one end thereof and at the opposite end thereof the control element forms
   a seal for said inner chamber; said control element is constructed as
   a rotational cylinder having
   a wall with
   interior and exterior wall surfaces, are cylindically shaped, said rotational cylinder is mounted above the said outlet passage, wherein at least the exterior wall surface of said rotational cylinder is
   frusto-conically shaped, and converges in the direction towards said dosing piston; and said wall of said rotational cylinder extends only over a portion of the periphery and subtends an arc of 165° to 180° and is
   axially slidably movably mounted along the axis of said rotational cylinder.

2. The improvement in the arrangement for dosingly filling of fluent and pasty filling material into containers as set forth in claim 1, wherein the exterior diameter of the dosing piston is smaller than the interior of the rotational cylinder and wherein said inner chamber includes a rinsing chamber and said dosing piston and rotational cylinder being simultaneously slidably movable in said ringing chamber, said rotational cylinder being rotatably and axially slidably movably mounted in a second support bearing which is operatively mounted in said housing.

3. The improvement in the arrangement for dosingly filling of fluent and pasty filling material into containers as set forth in claim 2, wherein said rotational cylinder is adpated to assume a rinsing position, said rotational cylinder being positioned so as to extend over said inlet and outlet passages when in said rinsing position.

4. The improvement in the arrangement for dosingly filling of fluent and pasty filling material into containers as set forth in claim 3, including rinsing fluid inlet and outlet conduit means in addition to said inlet and outlet passages which conduit means are operatively mounted in at least one of the following: the housing, the cover, and the second support bearing.

5. The improvement in the arrangement for dosingly filling of fluent and pasty filling material into containers as set forth in claim 4, wherein said rinsing conduit means form a closed fluid circuit.

6. The improvement in the arrangement for dosingly filling of fluent and pasty filling material into containers as set forth in claim 5, wherein the end wall of said rotational cylinder which confronts said second bearing support defines said rinsing chamber therewith.

7. The improvement in the arrangement for dosingly filling of fluent and pasty filling material into containers as set forth in claim 6, wherein said inlet and outlet passages extend tangentially relative to said rotational cylinder and the side of said rotational cylinder which faces away from said wall extending over a portion of said rotational cylinder defines a ring channel in said housing which subtends an arc in excess of 180°.

8. The improvement in the arrangement for dosingly filling of fluent and pasty filling material into containers as set forth in claim 7, wherein said second bearing support is mounted on said housing at the end opposite to the end on which said cover is mounted and defines a small opening between said opposite end.

9. The improvement in the arrangement for dosingly filling of fluent and pasty filling material into containers as set forth in claim 8, wherein said second bearing support is drivingly coupled via a pin with the rotational cylinder and is axially displaceably mounted to move into a production position towards said dosing piston and in an opposite direction into a rinsing position.

10. The improvement in the arrangement for dosingly filling of fluent and pasty filling material into containers as set forth in claim 1, wherein said frusto-conically shaped exterior wall surface of said rotational cylinder diverges in the direction towards said dosing piston.

11. The improvement in the arrangement for dosingly filling of fluent and pasty filling material into containers as set forth in claim 1, wherein the respective diameters of said rotational cylinder and dosing piston are equal and said inner chamber including a rinsing chamber disposed between the rotational cylinder and the bearing support block and housing, said rotational cylinder and dosing piston being one after the other slidably movable in said rinsing chamber.

* * * * *